US012652496B2

(12) United States Patent
Wen et al.

(10) Patent No.: US 12,652,496 B2
(45) Date of Patent: Jun. 9, 2026

(54) VOICE COIL STRUCTURE AND LOUDSPEAKER

(71) Applicant: Transound Electronics Co., Ltd., Dongguan (CN)

(72) Inventors: Tseng-Feng Wen, New Taipei (TW); Chun-Han Huang, New Taipei (TW); Chung-Hsien Tseng, New Taipei (TW)

(73) Assignee: TRANSOUND ELECTRONICS CO., LTD., New Taipei (TW)

( * ) Notice: Subject to any disclaimer, the term of this patent is extended or adjusted under 35 U.S.C. 154(b) by 238 days.

(21) Appl. No.: 18/521,011

(22) Filed: Nov. 28, 2023

(65) Prior Publication Data

US 2024/0205609 A1 Jun. 20, 2024

(30) Foreign Application Priority Data

Dec. 16, 2022 (CN) ........................ 202211628132.X

(51) Int. Cl.
*H04R 9/04* (2006.01)
*H04R 9/06* (2006.01)

(52) U.S. Cl.
CPC ............... *H04R 9/046* (2013.01); *H04R 9/06* (2013.01)

(58) Field of Classification Search
CPC .......... H04R 9/046; H04R 9/06; H04R 9/047; H04R 7/06; H04R 7/10; H04R 9/02; H04R 2499/11; H01F 17/0013; H01F 7/0289
USPC ................ 381/150, 408, 409, 410, 424, 431
See application file for complete search history.

(56) References Cited

U.S. PATENT DOCUMENTS

2018/0211775 A1 7/2018 Salvatti et al.
2021/0043367 A1* 2/2021 Yoshioka ............ H01F 27/2828
2022/0150636 A1* 5/2022 Chou ....................... H04R 9/06

FOREIGN PATENT DOCUMENTS

CN 106559728 A * 4/2017 ............... H04R 9/02
CN 108513236 A * 9/2018 ............... H04R 9/06
CN 208273239 U 12/2018
CN 208522987 U 2/2019
TW 200849292 A 12/2008
TW 201328373 A 7/2013
TW 202226842 A 7/2022

* cited by examiner

*Primary Examiner* — Duc Nguyen
*Assistant Examiner* — Chimezie Ezeriwe Bekee
(74) *Attorney, Agent, or Firm* — ScienBiziP, P.C.

(57) ABSTRACT

The present disclosure provides a voice coil structure and a loudspeaker. The voice coil structure includes a substrate, a first wiring layer disposed on the substrate, and a first insulation layer disposed on the first wiring layer. The first wiring layer has a winding structure. The first wiring layer further includes a first end and a second end. The first insulation layer defines a through hole and a first notch. The first end is exposed from the through hole, and the second end is exposed from the first notch.

18 Claims, 12 Drawing Sheets

100a

VOICE COIL STRUCTURE AND LOUDSPEAKER

FIELD

The subject matter relates to voice coil structures, and more particularly, to a voice coil structure and a loudspeaker having the voice coil structure.

BACKGROUND

A loudspeaker is an energy exchanger that converts an electrical signal to an acoustic signal. The loudspeaker is an important acoustic component in an electronic device such as a computer or a mobile phone. The loudspeaker mainly includes a magnetic system and a diaphragm structure. The diaphragm structure includes a diaphragm and a voice coil disposed on the diaphragm. The magnetic system produces a magnetic field. When the magnitude or direction of an external current applied to the voice coil changes, the voice coil may vibrate, thereby allowing the loudspeaker to produce sound. However, such voice coil structure may have a large size, which cannot be used in a miniaturized loudspeaker.

Therefore, there is room for improvement in the art.

SUMMARY

The present disclosure provides a voice coil structure, including a substrate, a first wiring layer, and a first insulation layer. The first wiring layer is disposed on the substrate. The first wiring layer has a winding structure that is wound around a clockwise or counterclockwise direction. The first wiring layer includes a first end and a second end. The first insulation layer is disposed on the first wiring layer. The first insulation layer defines a through hole and a first notch. The first end is exposed from the through hole, and the second end is exposed from the first notch.

The present disclosure further provides a loudspeaker, including a diaphragm and the above-mentioned voice coil structure. A surface of the substrate away from the first wiring layer is disposed on the diaphragm.

Other aspects and embodiments of the present disclosure are also expected. The above summary and the following detailed description are not intended to limit the present disclosure to any particular embodiment, but are merely intended to describe at least one embodiment of the present disclosure.

BRIEF DESCRIPTION OF THE DRAWINGS

Implementations of the present technology will now be described, by way of example only, with reference to the attached figures.

DETAILED DESCRIPTION

Implementations of the present disclosure will now be described, by way of embodiments only, with reference to the drawings. The described embodiments are only at least one embodiment of the present disclosure, rather than all the embodiments.

It should be noted that when a component is referred to as being or "mounted on" another component, the component can be directly on another component or a middle component may exist therebetween. When a component is considered to be "disposed on" another component, the component can be directly on another component or a middle component may exist therebetween.

Unless otherwise defined, all technical terms used herein have the same meaning as commonly understood by one of ordinary skill in the art. The technical terms used herein are not to be considered as limiting the scope of the embodiments.

Figure 1:
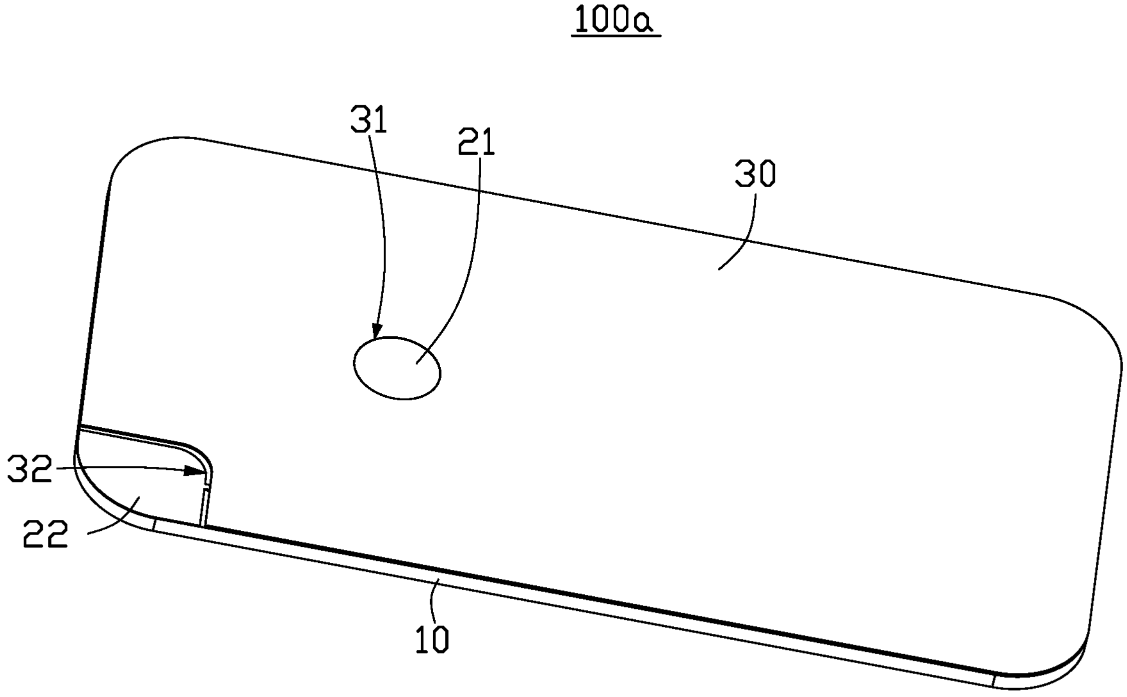
FIG. 1 is a diagrammatic view of a voice coil structure according to an embodiment of the present disclosure.
Figure 2:
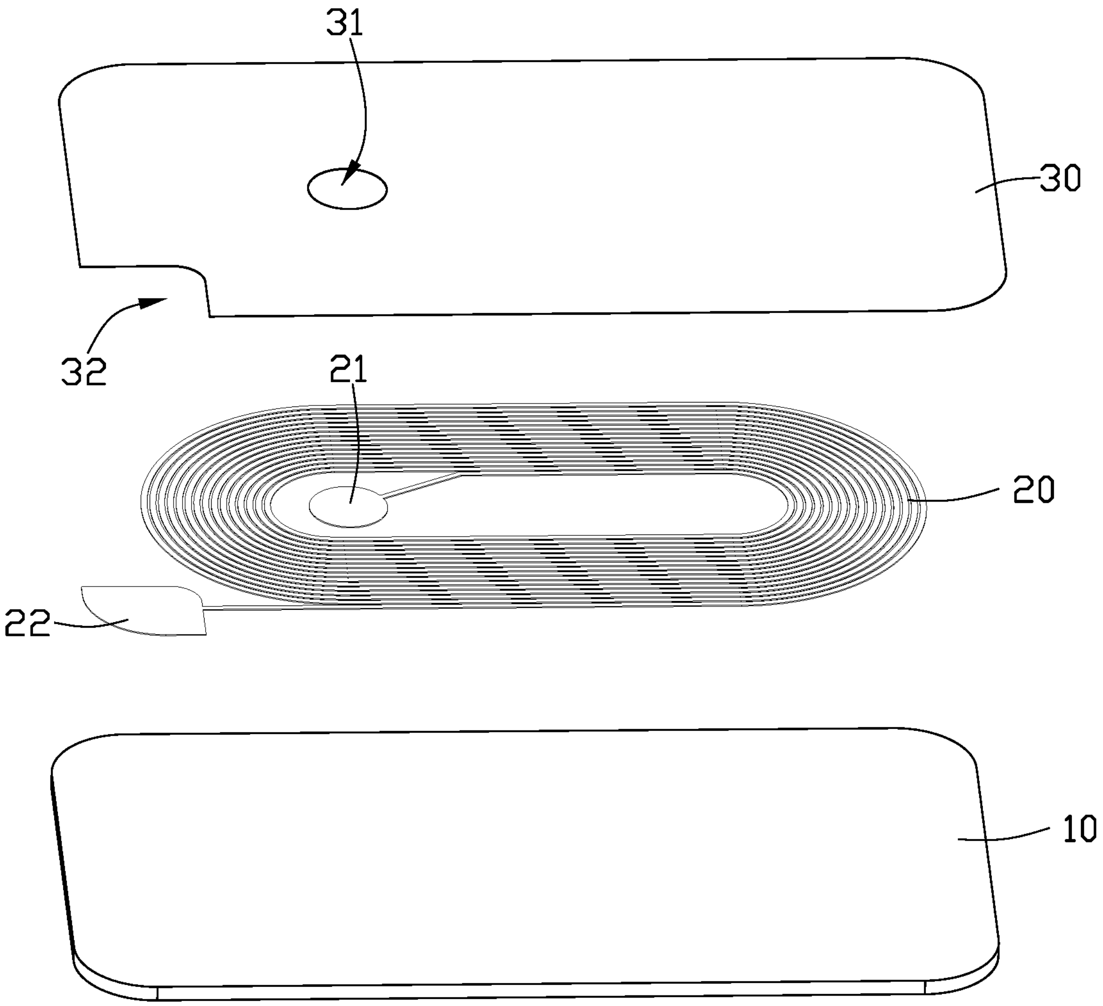
FIG. 2 is an exploded view of an embodiment of the voice coil structure shown in FIG. 1.

Referring to FIGS. 1 and 2, a voice coil structure **100*a* is provided according to an embodiment of the present disclosure. The voice coil structure 100*a* includes a substrate 10, a first wiring layer 20, and a first insulation layer 30. The first wiring layer 20 is disposed on the substrate 10, and the substrate 10 functions as a carrier of the first wiring layer 20. The first insulation layer 30 is disposed on the first wiring layer 20**.

The first wiring layer 20 has a winding structure. The first wiring layer 20 includes a first end 21 and a second end 22. The first end 21 and the second end 22 are two free ends of the first wiring layer 20. The first end 21 is located in a middle area of the first wiring layer 20, and the second end 22 is located out of the first wiring layer 20. The first insulation layer 30 defines a through hole 31 and a first notch 32. The first end 21 is exposed from the first insulation layer 30 through the through hole 31, and the second end 22 is exposed from the first insulation layer 30 through the first notch 32. The first end 21 and the second end 22 can connect to an external power supply such as by soldering, so that a current from the external power supply can be applied to the first wiring layer 20. Under a magnetic field, the first wiring layer 20 may move when the magnitude or direction of the current changes, thereby pushing a diaphragm 210 (shown in FIG. 8) connected to the first wiring layer 20 to vibrate back and forth in a normal direction of the substrate 10 to produce sound.

In at least one embodiment, the first wiring layer 20 is a coil that has a winding structure. The whole coil is on a same plane.

In related arts, a number of cylindrical coils are arranged on the diaphragm and stacked in a thickness direction of the diaphragm. The cylindrical coils cooperatively form a voice coil. Compared with the related arts, the first wiring layer 20 in the present disclosure has a winding structure and substantially two-dimensional planar structure. As such, the thickness of the voice coil structure 100*a* is reduced. That is, the size occupied by the voice coil structure 100*a* in the loudspeaker 200 is reduced, which is conducive to the miniaturization the loudspeaker 200.

In at least one embodiment, the substrate 10 may include a material selected from a group consisting of glass, polydimethylsiloxane (PDMS), polyimide (PI), or any combination thereof. The material of the substrate 10 may be selected according to actual needs, and such material of the substrate 10 can reduce the resistance of the diaphragm 210 when the diaphragm 210 vibrations.

In at least one embodiment, a thickness of the substrate 10 is in a range from 10 μm to 500 μm. Such thickness can increase the hardness of the substrate 10 without affecting the total thinness of the voice coil structure 100*a*. For example, the thickness of the substrate 10 is 10 μm, 15 μm, 20 μm, 25 μm, or 30 μm.

In at least one embodiment, a thickness of the first wiring layer 20 is in a range from 0.1 μm to 50 μm, and a spacing of wirings of the first wiring layer 20 is in a range from 1.0 μm to 100 μm. Compared to the existing cylindrical coils, the first wiring layer 20 has a substantially two-dimensional planar structure with a smaller thickness. Such thickness can reduce the total thickness of the voice coil structure 100*a*, and also allow the first wiring layer 20 to meet the impedance requirements.

Figure 3:
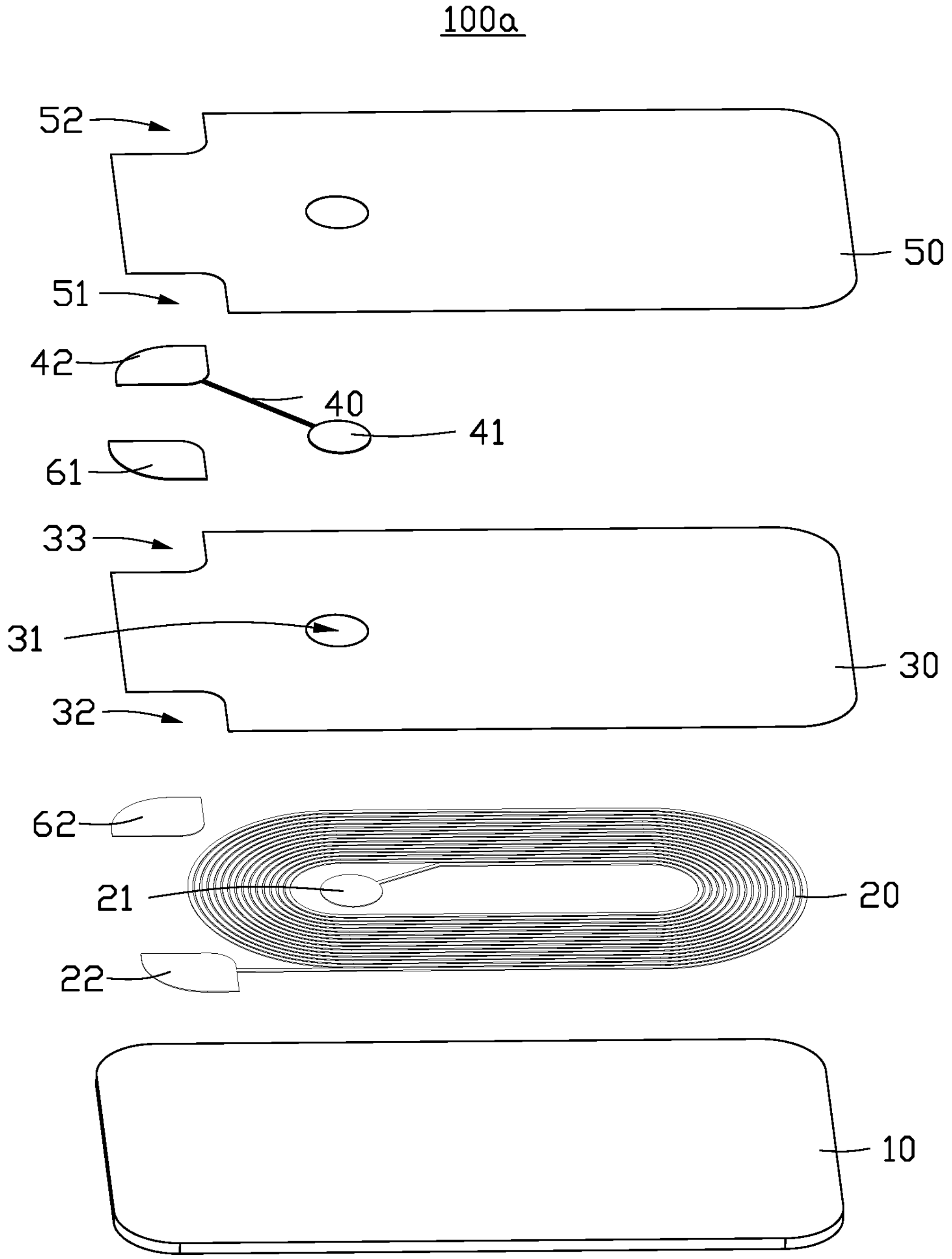
FIG. 3 is an exploded view of another embodiment of the voice coil structure shown in FIG. 1.

Referring to FIG. 3, in other embodiments, the voice coil structure 100*a* further includes a second wiring layer 40 and a second insulation layer 50. The second wiring layer 40 is disposed on the first insulation layer 30, and the second insulation layer 50 is disposed on the second wiring layer 40. The second wiring layer 40 includes a third end 41 and a fourth end 42. The third end 41 and the fourth end 42 are two free ends of the second wiring layer 40. The third end 41 is electrically connected to the first end 21 exposed from the through hole 31, thereby realizing the electrical connection between different wiring layers. The second insulation layer 50 defines a second notch 51 and a third notch 52, which are located at two corners of the second insulation layer 50. The second notch 51 is aligned with the first notch 32. The second end 22 is exposed from the second insulation layer 50 through the first notch 32 and the second notch 51. The fourth end 42 is exposed from the second insulation layer 50 through the third notch 52.

In the structure shown in FIG. 2, since the first end 21 is located in the middle area of the first wiring layer 20, to connect the first end 21 and the second end 22 of the first wiring layer 20 to the external power supply such as by soldering, another wire (not shown) is needed to connect the first end 21 to the external power supply. In the structure shown in FIG. 3, the third end 41 of the second wiring layer 40 is electrically connected to the first end 21, so the first end 21 can connect to the fourth end 42 through the third end 41. The fourth end 42 is exposed from the second insulation layer 50. Thus, the original soldering position at the first end 21 is transferred to the fourth end 42. The positive terminal and negative terminal of the external power supply can be respectively connected to the fourth end 42 and the second end 22 exposed from the second insulation layer 50. As such, the current can be applied to the first wiring layer 20 and the second wiring layer 40. Moreover, the original soldering position at the first end 21 is transferred to the fourth end 42 exposed from the corner of the second insulation layer 50, which facilitates the soldering efficiency between the external power supply and the fourth end 42 and also improves the appearance of the voice coil structure 100*a*.

Referring to FIG. 3, in at least one embodiment, the voice coil structure 100*a* further includes a first solder pad 61 and a second solder pad 62. The first solder pad 61 and the second wiring layer 40 are located on a same plane. The first solder pad 61 is electrically connected to the second end 22 exposed from the first notch 32. The first solder pad 61 is exposed from the second insulation layer 50 through the second notch 51, so that the original soldering position at the second end 22 is transferred to the first solder pad 61. The second solder pad 62 and the first wiring layer 20 are located on a same plane. A fourth notch 33 is further defined at the corner of the first insulation layer 30. The fourth notch 33 and the first notch 32 are located on a same side of the first insulation layer 30. The second solder pad 62 is electrically connected to the fourth end 42 exposed from the fourth notch 33, and the fourth end 42 is exposed from the second insulation layer 50 through the third notch 52.

In at least one embodiment, the first solder pad 61 and the fourth end 42 are exposed from a same side of the second insulation layer 50. As such, the soldering process is facilitated when the positive and negative terminals of the external power supply are respectively connected to the second end 22 and the fourth end 42 by soldering. In at least one embodiment, each of the first end 21, the second end 22, the third end 41, and the fourth end 42 has a structure like a solder pad.

Figure 4:
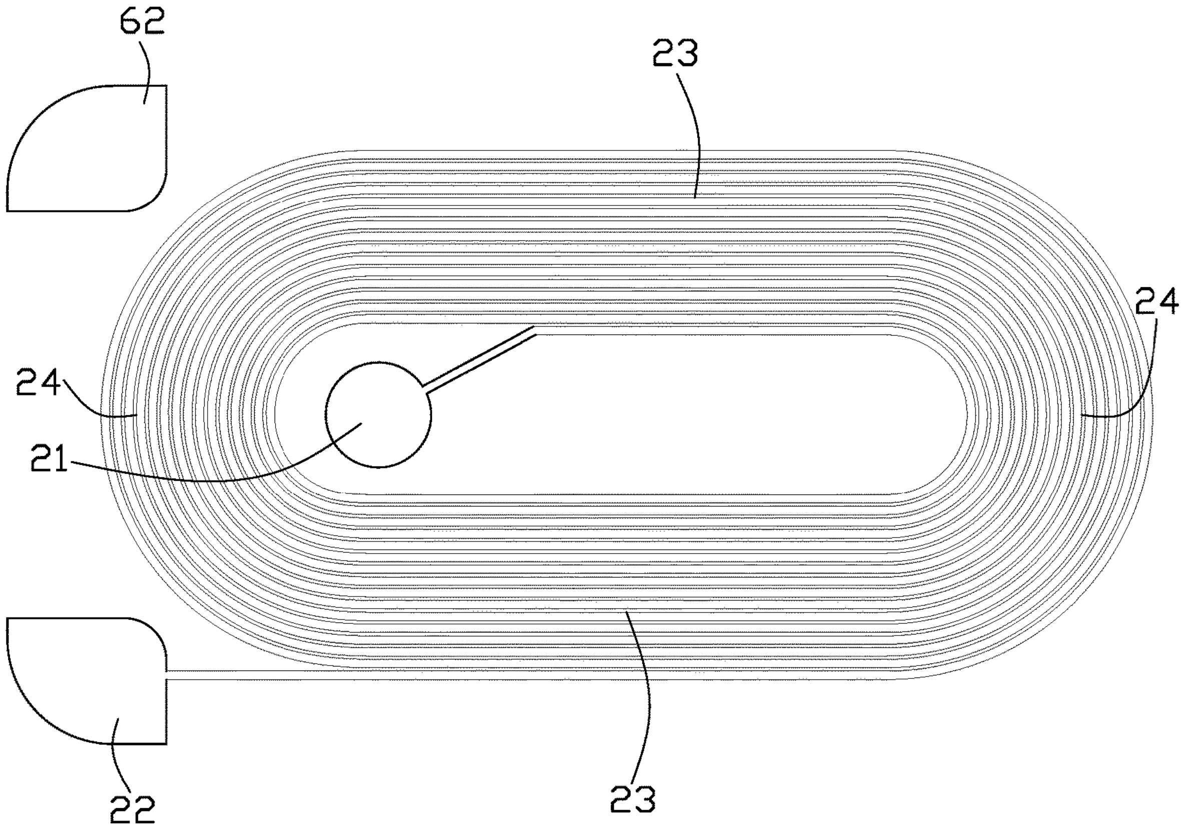
FIG. 4 is a diagrammatic view of an embodiment of a first wiring layer of the voice coil structure shown in FIG. 3.

Referring to FIG. 4, in at least one embodiment, the first wiring layer 20 further includes two straight segments 23 and two bent segments 24 each connected between the two straight segments 23. The bent segment 24 may has an arc structure, and is convex away from the first end 21. The two straight segments 23 and the two bent segments 24 are alternately arranged along a winding direction (for example, the clockwise direction shown in FIG. 4) of the first wiring layer 20. The whole first traverse layer 20 has a racetrack structure. Each of the two straight segment 23 may include a number of wiring segments parallel to each other. Each of the bent segments 24 may include a number of wiring segments parallel to each other. During manufacturing, a wire is wound around the first end 21 as a starting end to form the first wiring layer 20, and the second end 22 is a terminal end. The first end 21 and the second end 22 are on a same plane.

Figure 5:
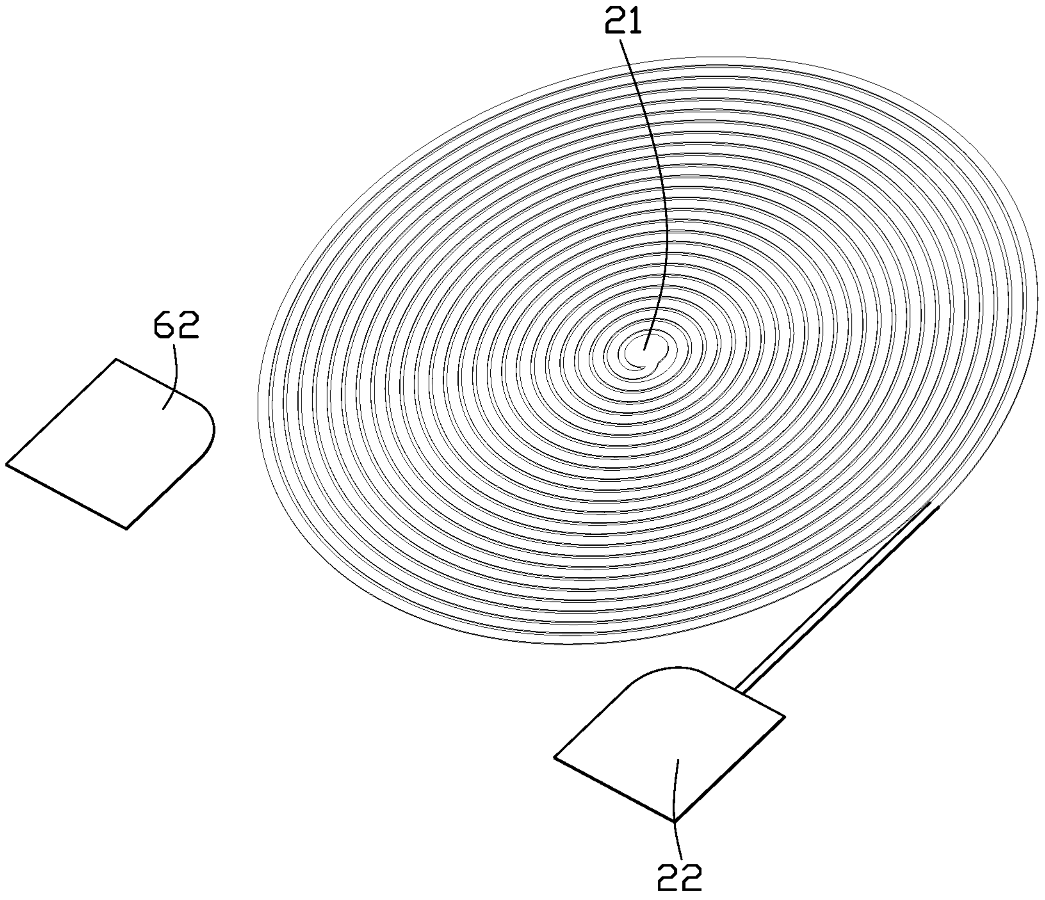
FIG. 5 is a diagrammatic view of another embodiment of the first wiring layer.

Referring to FIG. 5, in other embodiments, the wire is wound around the first end 21 as a starting end to form a number of concentric circles. Adjacent two concentric circles are spaced from each other. The outline of the first wiring layer 20 is substantially circular. The outline of the first wiring layer 20 may also be square, hexagonal, or irregular polygonal. The shape of the first wiring layer 20 may be selected according to actual needs.

Figure 6:
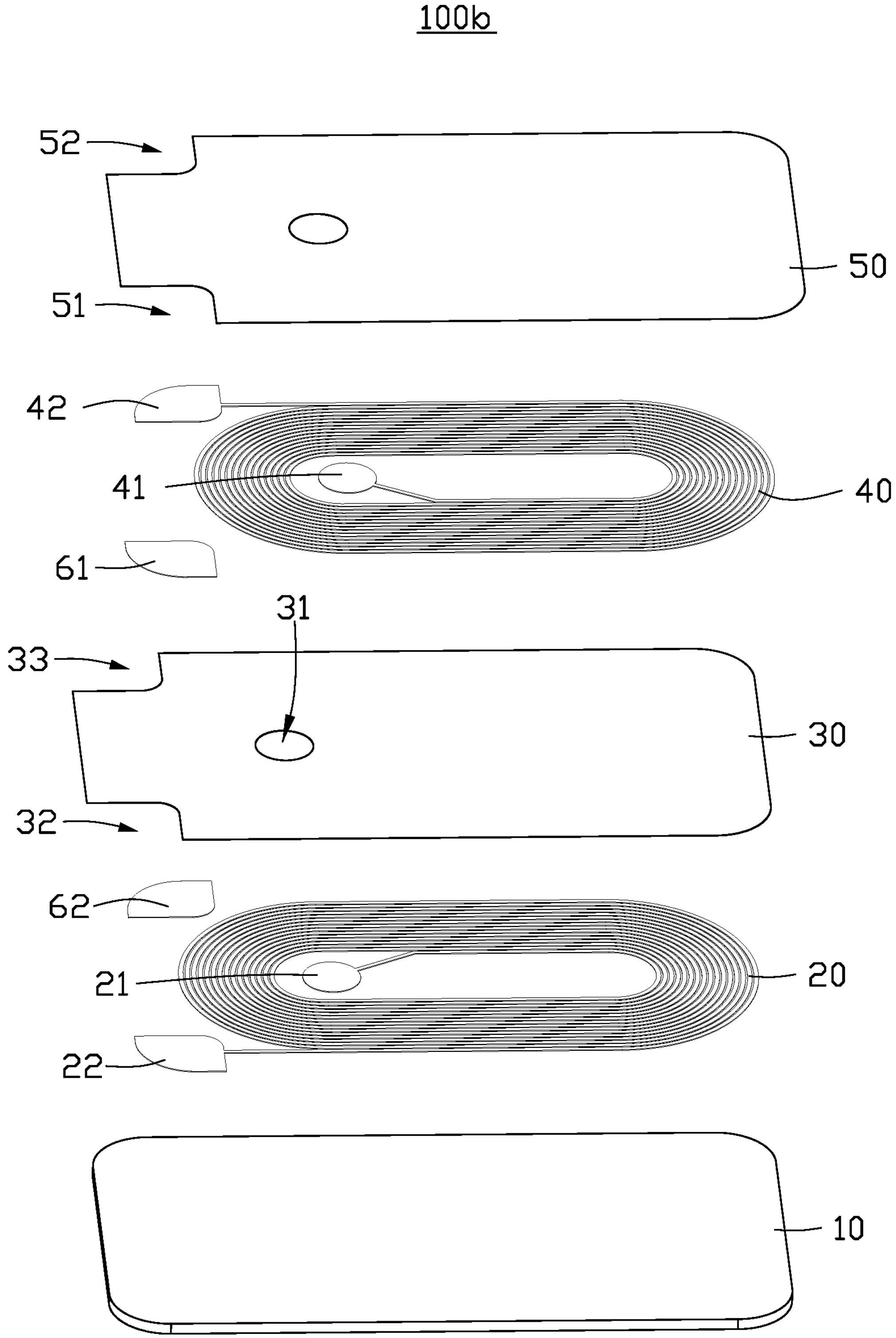
FIG. 6 is an exploded view of yet another embodiment of the voice coil structure shown in FIG. 1.

Referring to FIG. 6, a voice coil structure 100*b* is further provided according to another embodiment of the present disclosure. Different from the voice coil structure 100*a*, the second wiring layer 40 in the voice coil structure 100*b* is also a coil having a winding structure. The arrangement of the first wiring layer 20 and the second wiring layer 40 allows the voice coil structure 100*b* to have multiple coils. As such, the voice coil structure 100*b* can have a larger resistance value and a larger vibration amplitude. Thus, the voice coil structure 100*b* can drive the diaphragm 210 to produce Treble and Alto. In other embodiments, more coils having a winding structure (not shown) may also be formed on the second insulation layer 50. The shape, size, and impedance of each of the first wiring layer 20 and the second wiring layer 40 can be adjusted according to actual needs. For example, the shape of the coil can be circular, square, or spiral. The impedance of the first wiring layer 20 is the same as that of the second wiring layer 40, which may be in a range from 16Ω to 18Ω.

The winding number of each of the first wiring layer 20 and the second wiring layer 40 may also be selected according to actual needs. Each of the first wiring layer 20 and the second wiring layer 40 includes a material selected from a group consisting of aluminum, copper, silver, gold, or any combination thereof. For example, the coil is a copper coil, aluminum coil, silver coil, or gold coil. Each of the first insulation layer 30 and the second insulation layer 50 includes a material selected from a group consisting of epoxy resin, siloxane, polybenzoxazole (PBO), acrylic resin, and any combination thereof.

Figure 7:
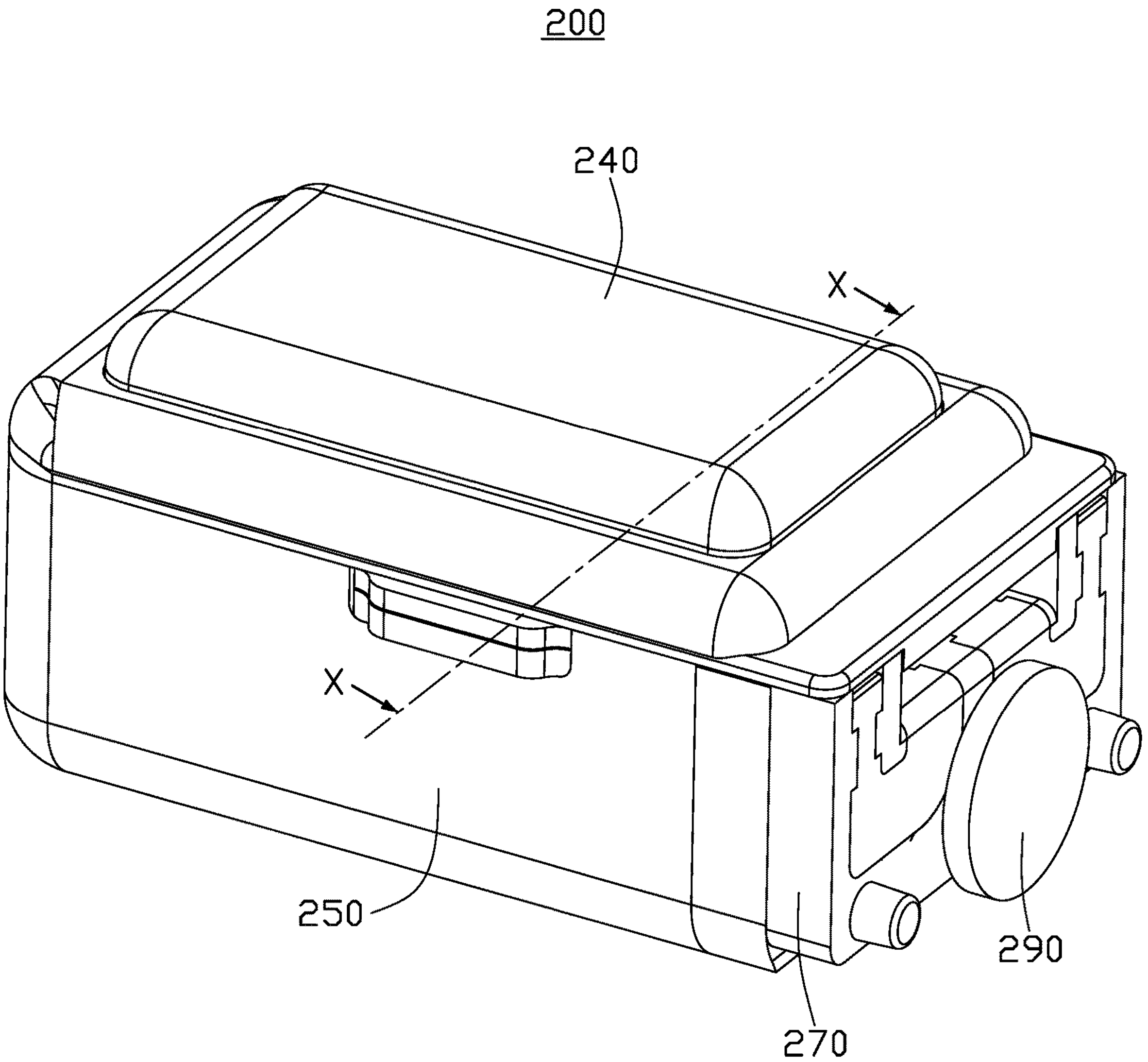
FIG. 7 is a diagrammatic view of a loudspeaker according to an embodiment of the present disclosure.
Figure 8:
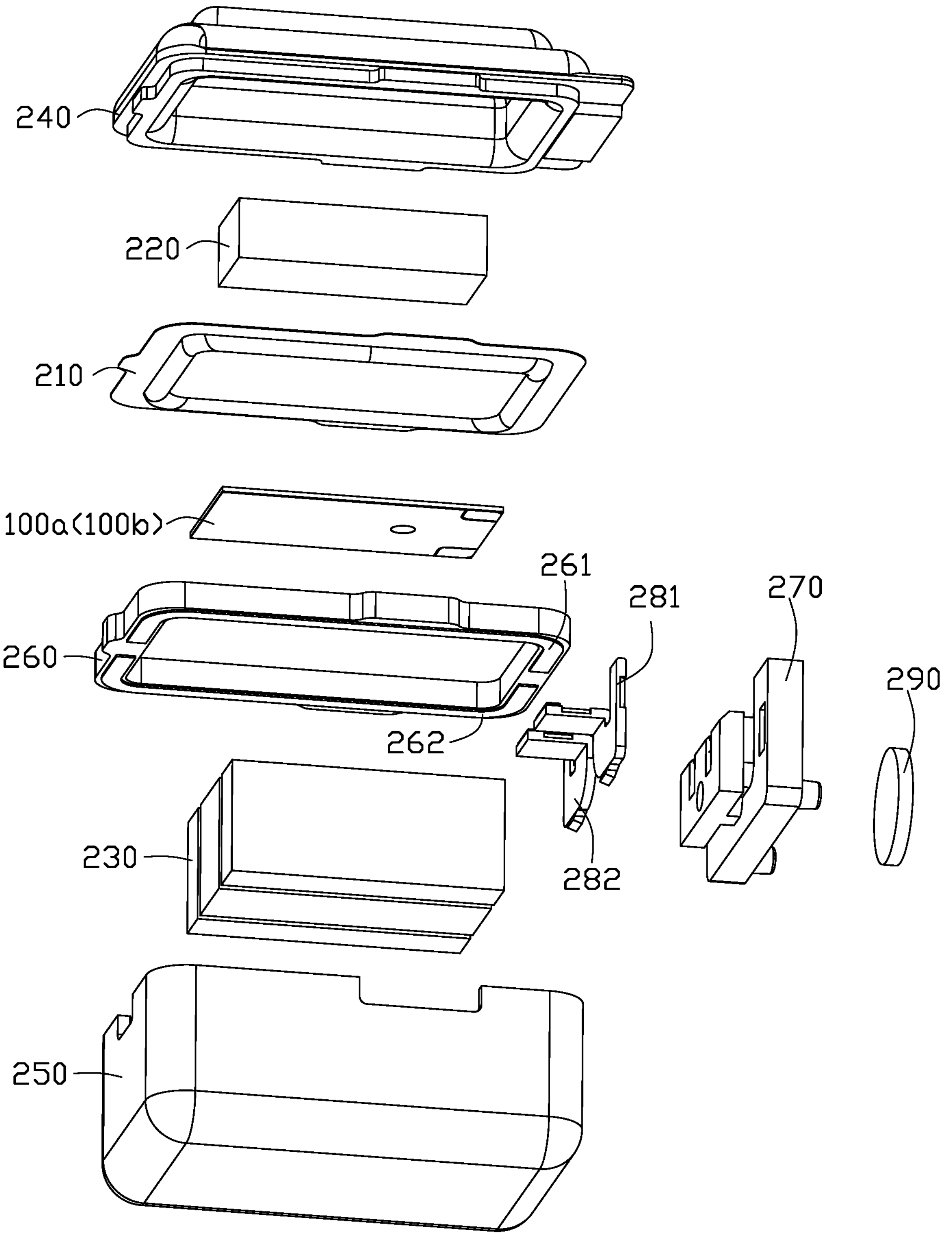
FIG. 8 is an exploded view of the loudspeaker shown in FIG. 7.
Figure 9:
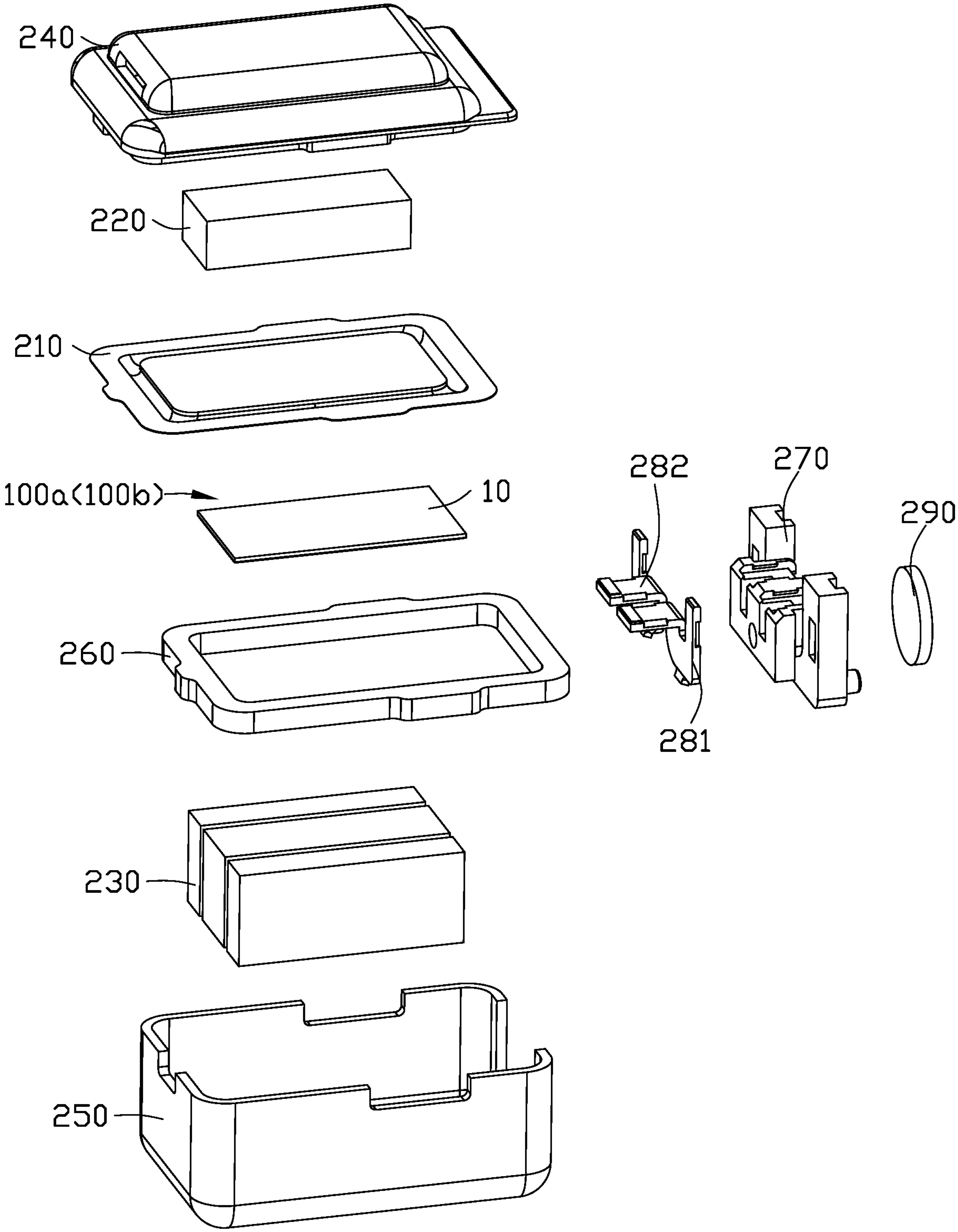
FIG. 9 is an exploded view illustrating the loudspeaker of FIG. 8 from another angle.

Referring to FIGS. 7 to 9, a loudspeaker 200 is further provided according to an embodiment of the present disclosure. The loudspeaker 200 includes the diaphragm 210, the voice coil structure 100*a* (or voice coil structure 100*b*), a first magnetic member 220, and a second magnetic member 230. The first magnetic member 220 and the second magnetic member 230 are disposed on two sides of the voice coil structure 100*a* (100*b*). A surface of the substrate 10 away from the first wiring layer 20 is disposed on the diaphragm 210. An adhesive layer (not shown) may also be arranged between the diaphragm 210 and the substrate 10, and the diaphragm 210 and the substrate 10 may be connected through the adhesive layer. Each wiring layer in the voice coil structure 100*a* can produce a magnetic field after being energized, and the energized wiring layer can vibrate under the function of the first magnetic member 220 and the second magnetic member 230. The wiring layer then drives the diaphragm 210 to vibrate, thereby generating sound.

Figure 10:
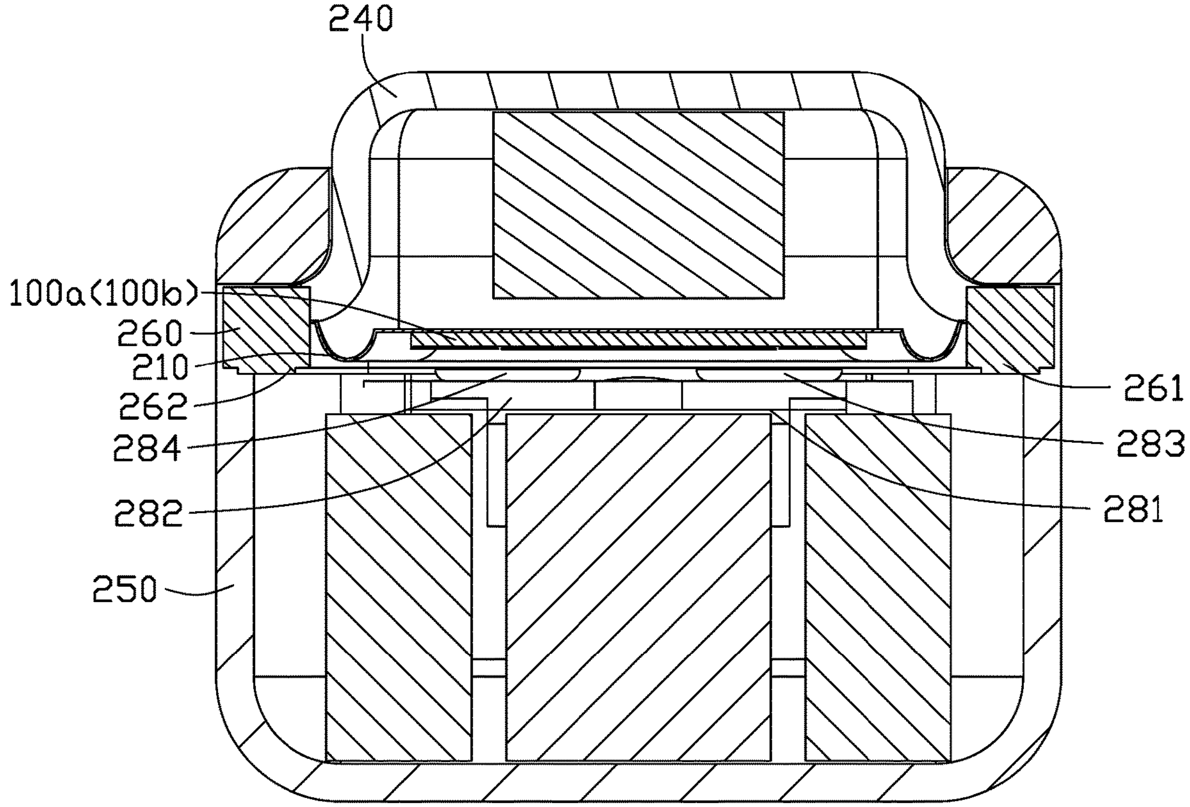
FIG. 10 is a cross-sectional view along line X-X shown in FIG. 7.

Referring to FIGS. 8 to 10, in at least one embodiment, the loudspeaker 200 further includes a first housing 240, a second housing 250, a support frame 260, a fixing base 270, a first conductive sheet 281, and a second conductive sheet 282. The first housing 240 and the second housing 250 are connected to each other such as by a clamping manner. The diaphragm 210, the first magnetic member 220, the second magnetic member 230, the voice coil structure 100*a*, and the support frame 260 are all received in a space defined by the first housing 240 and the second housing 250. The first magnetic member 220 is fixed in the first housing 240. For example, the first magnetic member 220 may be glued to the inner surface of the first housing 240. The first magnetic member 220 may also be embedded into the wall of the first housing 240. The second magnetic member 230 is fixed in of the second housing 250. For example, the second magnetic member 230 may be glued to the inner surface of the second housing 250. The second magnetic member 230 may also be embedded into the wall of the second housing 250. The support frame 260 is fixed on an inner wall of the first housing 240. The support frame 260 is further fixed to an edge of diaphragm 210 such as by gluing. As such, the diaphragm 210 is fixed to the first housing 240 through the support frame 260. The support frame 260 is substantially square. The support frame 260 may be a plate made of flexible plastic. In at least one embodiment, each of the first magnetic member 220 and the second magnetic member 230 may include one or more magnets.

Figure 11:
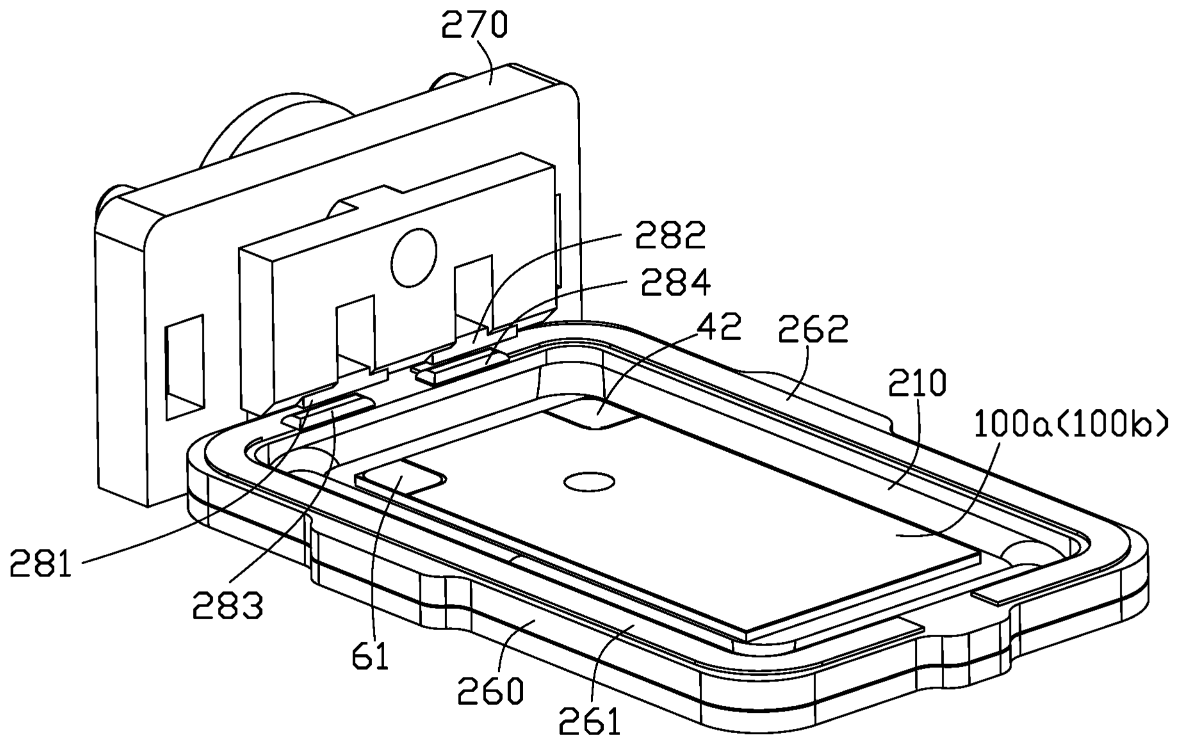
FIG. 11 is a diagrammatic view illustrating a support frame and a fixing base shown in FIG. 10.

Referring to FIGS. 8, 10, and 11, the diaphragm 210 and the voice coil structure 100*a* re located in a hollow cavity of the support frame 260. The diaphragm 210 and the voice coil structure 100*a* both vibrate in the hollow cavity of the support frame 260. In at least one embodiment, the support frame 260 is provided with a first conductive adhesive 261 and a second conductive adhesive 262. The first conductive adhesive 261 and the second conductive adhesive 262 are not connected but spaced from each other. The first conductive segment 261 and the second conductive segment 262 are located on a same surface of the support frame 260. The first conductive adhesive 261 is electrically connected to the first solder pad 61 of the voice coil structure 100*a*, and the second conductive adhesive 262 is electrically connected to the fourth end 42 of the voice coil structure 100*a*.

Figure 12:
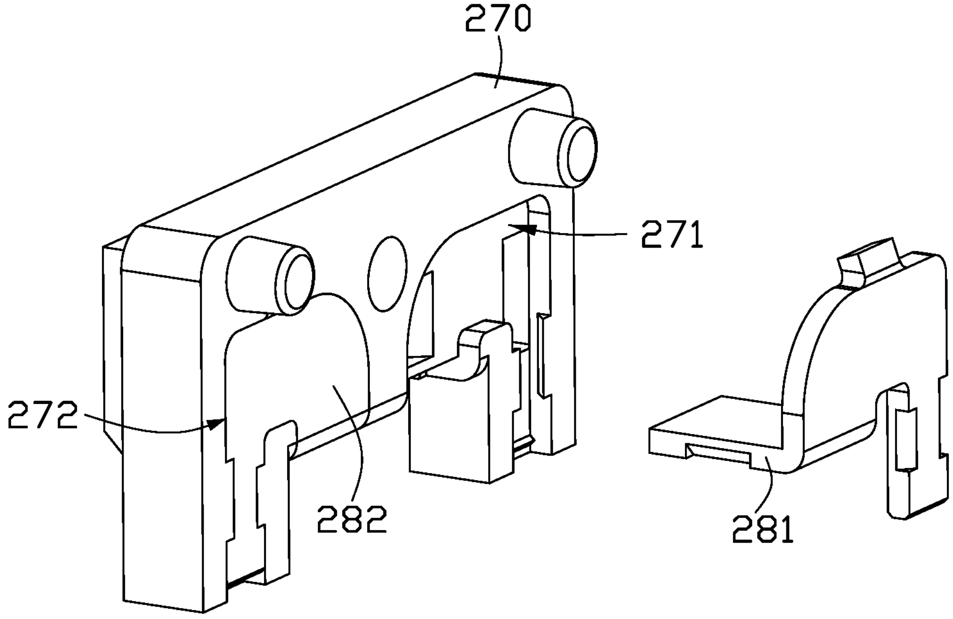
FIG. 12 is a diagrammatic view illustrating the fixing base shown in FIG. 11 from another angle.

Referring to FIGS. 11 and 12, when the first housing 240 and the second housing 250 are connected to each other, the fixing base 270 is disposed on a side of the first housing 240 and the second housing 250. The fixing base 270 may be connected to the first housing 240 and the second housing 250 such as by gluing or screwing. The first conductive sheet 281 and the first conductive sheet 281 are both mounted on the fixing base 270. In at least one embodiment, the fixing base 270 defines a first mounting groove 271 and a second mounting groove 272. The first mounting groove 271 and the second mounting groove 272 may have a same structure and are located on a surface of the fixing base 270 away from the first housing 240. The first conductive sheet 281 is received in the first mounting groove 271 and exposed from the surface of the fixing base 270. One end of the first conductive sheet 281 extends through the fixing base 270, and is located on and connected to the first conductive adhesive 261. The second conductive sheet 282 is received in the second mounting groove 272 and exposed from the surface of the fixing base 270. One end of the second conductive sheet 282 extends through the fixing base 270, and is located on and connected to the second conductive adhesive 262. The first conductive sheet 281 is electrically connected to the positive terminal of the external power supply. The first conductive sheet 281 is further electrically connected to the first solder pad 61 of the voice coil structure 100*a* through the first conductive adhesive 261. The second conductive sheet 282 is electrically connected to the negative terminal of the external power supply. The second conductive sheet 282 is further electrically connected to the fourth end 42 of the voice coil structure 100*a* through the second conductive adhesive 262. Thus, the wiring ends of the voice coil structure 100*a* is introduced outside of the loudspeaker 200 through the first conductive sheet 281 and the second conductive sheet 282, thereby facilitating the connection between the loudspeaker 200 and the external power supply.

Referring to FIGS. 11 and 12, in at least one embodiment, a first solder disc 283 is provided between the first conductive adhesive 261 and the first conductive sheet 281. A second solder disc 284 is provided between the second conductive adhesive 262 and the second conductive sheet 282. The first solder disc 283 electrically connects the first conductive sheet 281 to the first conductive adhesive 261. The second solder disc 284 electrically connects the second conductive sheet 282 to the second conductive adhesive 262.

In at least one embodiment, a tuning mesh 290 is further fixed on the fixing base 270 such as by gluing.

With the above configuration, the voice coil structure 100*a* (100*b*) provided by the present disclosure can replace the cylindrical voice coils in the related arts. The voice coil structure 100*a* has universality, which can be combine with an existing diaphragm without the need to change the structure of the diaphragm. The first wiring layer 20 has a winding and substantially two-dimensional planar structure. As such, the thickness of the voice coil structure 100*a* is reduced. That is, the size occupied by the voice coil structure 100*a* in the loudspeaker 200 is reduced, which is conducive to the miniaturization the loudspeaker 200.

In addition, compared with the existing cylindrical voice coils, the voice coil structure 100*a* (100*b*) provided by the present application is thinner and have a larger surface area. Thus, the gluing area of the voice coil structure 100*a* is increased, thereby improving the stability of the voice coil structure 100*a* installed on the diaphragm 210 and preventing the voice coil structure 100*a* from separating from the diaphragm 210.

Even though information and advantages of the present embodiments have been set forth in the foregoing description, together with details of the structures and functions of the present embodiments, the present disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A voice coil structure comprising:
- a substrate;
- a first wiring layer disposed on the substrate and having a winding structure, the first wiring layer comprising a first end and a second end;
- a first insulation layer disposed on the first wiring layer, the first insulation layer defining a through hole located at an interior of the first insulation layer and a first notch located at a corner of the first insulation layer, the first end exposed from the through hole, and the second end exposed from the first notch;
- a second wiring layer disposed on the first insulation layer, and comprising a third end and a fourth end; and
- a second insulation layer disposed on the second wiring layer, the second insulation layer defining a second notch located at a corner of the second insulation layer and a third notch located at another corner of the second insulation layer, wherein the second notch and the third notch are located at a same side of the second insulation layer, the second notch is aligned with the first notch, the second end is further exposed from the second notch, the third end is electrically connected to the first end exposed from the through hole, and the fourth end is exposed from the third notch.

2. The voice coil structure of claim 1, further comprising a first solder pad and a second solder pad, wherein the first solder pad and the second wiring layer are located on a same plane, the first solder pad is electrically connected to the second end exposed from the first notch, and the first solder pad is exposed from the second notch; the second solder pad and the first wiring layer are located on a same plane, the first insulating layer further defines a fourth notch located at another corner of the first insulating layer, the second solder pad is exposed from the fourth notch, and the fourth end is electrically connected to the second solder pad exposed from the fourth notch.

3. The voice coil structure of claim 2, wherein the first pad and the fourth end are exposed from a same side of the second insulation layer.

4. The voice coil structure of claim 1, wherein the second wiring layer has a winding structure.

5. The voice coil structure of claim 1, wherein a thickness of the substrate is in a range from 10 μm to 500 μm, a thickness of the first wiring layer is in a range from 0.1 μm to 50 μm, and a spacing of wirings of the first wiring layer is in a range from 1.0 μm to 100 μm.

6. The voice coil structure of claim 1, wherein the first wiring layer comprises a material selected from a group consisting of aluminum, copper, silver, gold, or any combination thereof.

7. The voice coil structure of claim 1, wherein the substrate comprises a material selected from a group consisting of glass, polydimethylsiloxane, polyimide, or any combination thereof.

8. The voice coil structure of claim 1, wherein the first wiring layer comprises two straight segments and two bent segments which are alternately arranged in a winding direction of the first wiring layer, and each of the two bent segments is convex away from the first end.

9. The voice coil structure of claim 1, wherein the first wiring layer is formed by winding a wire around the first end as a starting end, the second end is a terminal by winding the wire, and the first end and the second end are located on a same plane.

10. A loudspeaker comprising:
- a diaphragm; and
- a voice coil structure comprising:
  - a substrate;
  - a first wiring layer disposed on the substrate, the first wiring layer having a winding structure, the first wiring layer comprising a first end and a second end;
  - a first insulation layer disposed on the first wiring layer, the first insulation layer defining a through hole located at an interior of the first insulation layer and a first notch located at a corner of the first insulation layer, the first end exposed from the through hole, the second end exposed from the first notch, a surface of the substrate away from the first wiring layer disposed on the diaphragm;
  - a second wiring layer disposed on the first insulation layer, and comprising a third end and a fourth end; and
  - a second insulation layer disposed on the second wiring layer, the second insulation layer defining a second notch located at a corner of the second insulation layer and a third notch located at another corner of the second insulation layer, wherein the second notch and the third notch are located at a same side of the second insulation layer, the second notch is aligned with the first notch, the second end is further exposed from the second notch, the third end is electrically connected to the first end exposed from the through hole, and the fourth end is exposed from the third notch.

11. The loudspeaker of claim 10, further comprising a support frame, a first conductive adhesive, and a second conductive adhesive, wherein the diaphragm is disposed on the support frame, the first conductive adhesive and the second conductive adhesive are disposed on a surface of the support frame, the first conductive adhesive is electrically connected to the first end, and the second conductive adhesive is electrically connected to the second end.

12. The loudspeaker of claim 10, wherein the voice coil structure further comprises a first solder pad and a second solder pad, the first solder pad and the second wiring layer are located on a same plane, the first solder pad is electrically connected to the second end exposed from the first notch, and the first solder pad is exposed from the second notch; the second solder pad and the first wiring layer are located on a same plane, the first insulating layer further defines a fourth notch located at another corner of the first insulating layer, the second solder pad is exposed from the fourth notch, and the fourth end is electrically connected to the second solder pad exposed from the fourth notch.

13. The loudspeaker of claim 12, wherein the first pad and the fourth end are exposed from a same side of the second insulation layer.

14. The loudspeaker of claim 10, wherein the second wiring layer has a winding structure.

15. The loudspeaker of claim 10, wherein a thickness of the substrate is in a range from 10 μm to 500 μm, a thickness of the first wiring layer is in a range from 0.1 μm to 50 μm, and a spacing of wirings of the first wiring layer is in a range from 1.0 μm to 100 μm.

16. The voice coil structure of claim 10, wherein the first wiring layer comprises a material selected from a group consisting of aluminum, copper, silver, gold, or any combination thereof.

17. The loudspeaker of claim 10, wherein the substrate comprises a material selected from a group consisting of glass, polydimethylsiloxane, polyimide, or any combination thereof.

18. The loudspeaker of claim 10, wherein the first wiring layer comprises two straight segments and two bent segments which are alternately arranged in a winding direction of the first wiring layer, and each of the two bent segments is convex away from the first end.

* * * * *